United States Patent [19]
Rendall

[11] Patent Number: 5,387,276
[45] Date of Patent: Feb. 7, 1995

[54] METHOD OF LEACHING MINERAL VALUES FROM OIL SAND TAILINGS

[75] Inventor: John S. Rendall, Albuquerque, N. Mex.

[73] Assignee: Solv-Ex Corporation, Albuquerque, N. Mex.

[21] Appl. No.: 165,974

[22] Filed: Dec. 10, 1993

[51] Int. Cl.[6] .................................................. C22B 3/00
[52] U.S. Cl. ............................. 75/743; 75/435; 75/712; 75/744
[58] Field of Search .................. 75/435, 743, 744, 712

[56] References Cited

U.S. PATENT DOCUMENTS

| | | | |
|---|---|---|---|
| 4,017,309 | 4/1977 | Johnson | 75/101 |
| 4,526,615 | 7/1985 | Johnson | 75/101 |
| 4,961,910 | 10/1990 | Vanderpool | 75/743 |
| 4,979,987 | 12/1990 | Mason | 75/743 |
| 5,124,008 | 6/1992 | Rendall | 204/61 |
| 5,181,956 | 1/1993 | Chao | 75/743 |

OTHER PUBLICATIONS

Bureau of Mines Rptr. 6229, by F. Peters, et al. U.S. Dept. of Interior, 1963.

*Primary Examiner*—Peter D. Rosenberg
*Attorney, Agent, or Firm*—Thomas E. Schatzel

[57] ABSTRACT

A method of removal of valuable minerals of oil sand tailings including continuous operation of mixing said tailings with acid, curing the agglomeration and leaching of the cured agglomeration for removal of valuable minerals.

11 Claims, 1 Drawing Sheet

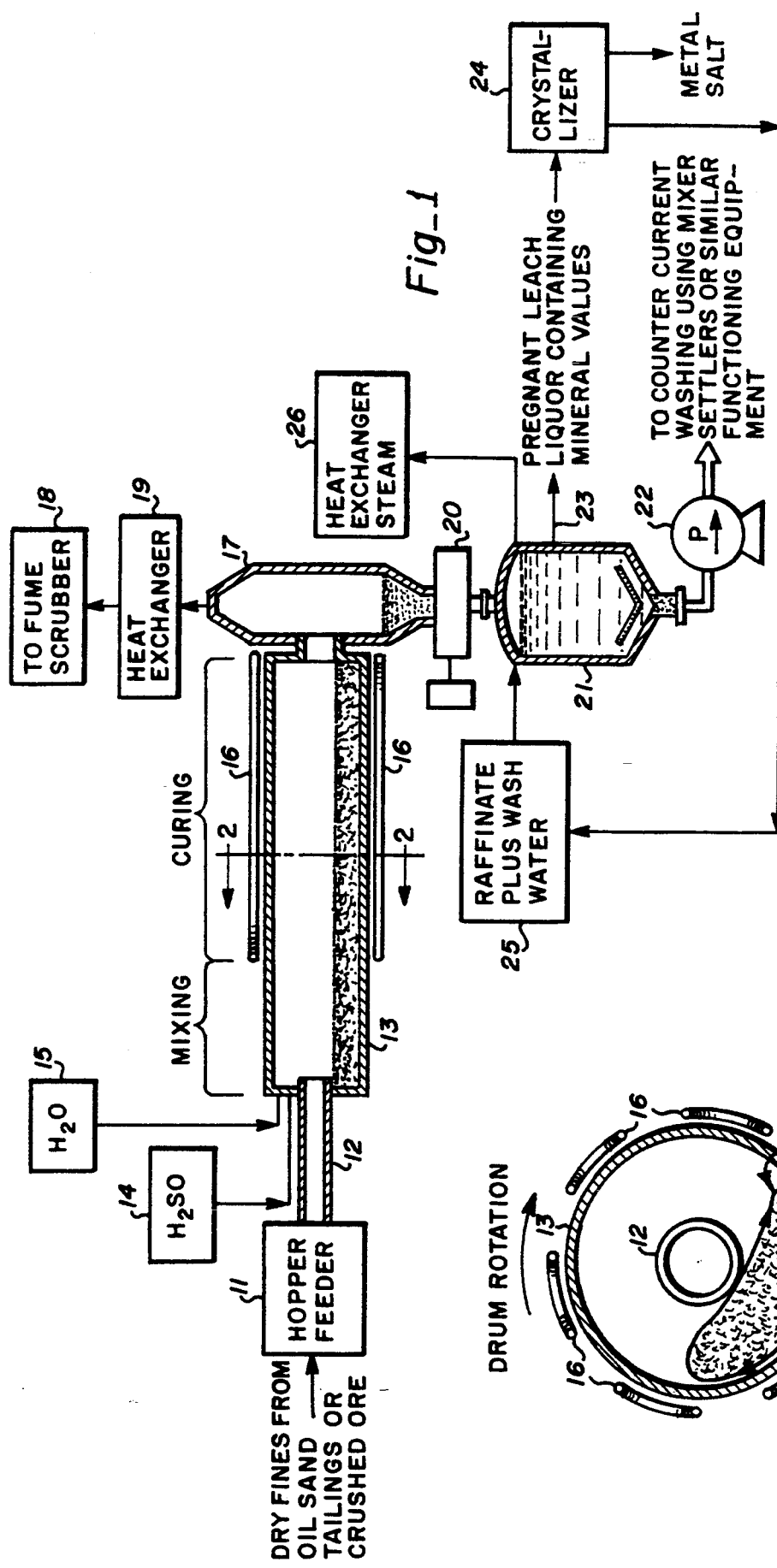

METHOD OF LEACHING MINERAL VALUES FROM OIL SAND TAILINGS

BACKGROUND OF THE INVENTION

1. Field of the Invention

This invention relates to a method of leaching mineral values from oil sand tailings of mine operations of oil sand or crushed ore, and more particularly to a method of continuous acid addition to the tailings and simultaneously allowing for the curing reaction to be carried out in the same step on a continuous basis.

2. Description of the Prior Art

A method of curing and leaching the dry fines produced from mine tailings is described in U.S. Pat. No. 5,124,008. The system of mixing acid with dry fines and then curing such in boxes, heaps or thin layers as described in said '008 Patent; procedures used in the copper and uranium industries in processing crushed ore such as removable heap leach methods; thin layer leaching as disclosed in U.S. Pat. No. 4,017,309; and cellular heap leaching as disclosed in U.S. Pat. No. 4,526,615 all involve a batch curing system and percolation leach techniques on a batch basis. These methods require use of large surface areas for the curing over a protracted period of time due to the required leach efficiencies. Thus, the required surface areas of storage are considerable. In cold climates, this drawback is enhanced.

SUMMARY OF THE PRESENT INVENTION

An object of the present invention is to provide a method of continuous operation of acid mixing, curing and leaching circuits for removal of valuable minerals from dry fines of oil sand tailings from crushed ore or mine operations.

Another object of the present invention is to reduce processing time of removal of minerals from oil sand tailings, and thereby reduce processing volumes of oil sand tailings in progress at any given time.

Another object of the present invention is to overcome acid mixing problems with oil sand tailings such as stickiness while maintaining conditions for continuous curing in terms of temperature and moisture content of the agglomerates.

Briefly, a preferred embodiment of the present invention starts with dried oil sand fines from the treating of mine tailings or crushed ore. For example, such fines may result from processing as described in the '008 Patent or processes described in U.S. Bureau of Mines report of investigation (RI) 6229 (1963) by Scott, showing fine ore feed for acid mixing, agglomeration, heap curing and percolation leaching. The dry fines of particle size less than a preferred −325 mesh, but with smaller percentages up to −100 mesh, and containing water of less than approximately twelve percent (12%) by weight are fed continuously with concentrated (>93% by weight) sulfuric acid, with or without a spray of water, into a mixer, e.g. a rotary drum agglomerator. The volume of the preferred agglomerates within the rotary drum is selected such that the drum operates with up to thirty percent (30%) full of such preformed agglomerates to avoid problems of the fines mixing with acid and sticking on the drum surfaces. The mixing action occurs in the tumbling agglomerates, for a period depending on the mineralogical characteristics of the ore bodies. In the case of fine oil sand tailings from ore bodies originating with Athabasca, Canada, the mixing period is approximately fifteen (15) minutes.

The dissolution of alumina values in sulphuric acid is highly exothermic. Thus, the temperature rise is balanced by the evaporation of water. External heat is needed to overcome these equilibrium conditions. Thus, this mixed bed of agglomerates may then be fed to a heated drum. This can be done by feeding the agglomerates to a separate indirectly heated rotary drum or along an indirectly heated section of the same drum. The mixing and indirect heating of the fines/acid mixture may also be performed with other equipment, e.g. turbulisers, pin mixers or plough mixers for mixing; and heated screws or jacketed blenders for curing. The size of the agglomerates do not appear to affect the curing time or the leachability of the mineral values. The residence time and temperature in the cure section varies with the mineralogical characteristics of the ore body. In the case of fines originating with Athabasca, Canada, wherein aluminum values are of prime importance, the exit temperature of the pellets from the heated drum is preferably between 170°–200° C. with a residence time of thirty (30) minutes within the heated drum.

The cured agglomerates are continuously discharged into a water/leach liquor bath with the slurry discharged continuously via one or more thickeners in series in order to recover the mineral values. This counter wash of acid treated fines produces clean washed fines and pregnant leach liquor containing the mineral values obtained from acid treating the fines. The washed fines may then be alkali treated to neutralize the filter cake or slurry for backfill.

An advantage of the present invention is that it provides for a method of a continuous operation of an entire process from leaching mineral values for oil sand tailings.

Another advantage of the method of the present invention is that it reduces the steps necessary to leach out mineral values from oil sand tailings while producing a cake residue suitable for direct backfill or via a settling pond.

A further advantage of the method of the present invention is that it reduces the size of the required processing plant and the required residence time of the material being processed to a couple of hours rather than a day or more.

Another advantage of the method of the present invention is that the stickiness of acid-mixed fines to the processing equipment is reduced, since it allows for use of a bed of agglomerates to improve the mixing action about the surfaces of the mixing equipment.

Another advantage of the method of the present invention is that indirect heating of the acid-mixed fines allows for the reaction to proceed rapidly while retaining the water needed to promote the reaction and a volume of heated agglomerates continuously proceeds to a discharge area while the reaction is being completed.

These and other objects and advantages of the present invention will no doubt become obvious to those of ordinary skill in the art after having read the following detailed description of the preferred embodiment which is illustrated in the drawings.

IN THE DRAWINGS

FIG. 1 is a sketch of the overall process of the present invention; and

FIG. 2 is a cross-sectional view of the drum of FIG. 1 along line 2—2 and represents the unusual effect of the action in the rotary drum.

DETAILED DESCRIPTION OF THE PREFERRED EMBODIMENT

FIG. 1 illustrates the overall process of the present invention, referred to by the general reference character 10, steps for mixing sulphuric acid with fines from tailings or crushed ore and leaching mineral values. The process 10 begins with fines being fed to a feed hopper 11 and then transferred via a screw feeder 12 into a mixing stage of a rotary drum 13. The fines, e.g. if they originate from Athabasca, Canada, will contain valuable minerals including potassium, aluminum sulphur and bitumen. A supply of sulphuric acid 14 is metered into the mixing stage of rotary drum 13 on the basis of sufficient acid to convert the metals in the fines to sulphates in stoichiometric quantities. A supply of water 15 is metered into the mixing stage of rotary drum 13 to equilibrate evaporation while leaving sufficient moisture in the agglomerates. The amount of water is such that said resultant moisture is in the order of five percent (5%) of the weight of the agglomerates.

The volume of agglomerates in rotary drum 13 is maintained up to a minimum of approximately thirty percent (30%) of the capacity of the drum by controlling release of agglomerates at the discharge end of the drum. The greater the amount of material in the drum 13, up to a maximum of approximately thirty-five percent (35%), the better the cure. This is unexpected in the operation of a rotary kiln which normally operates at ten percent (10%) capacity for good roasting. As the mixture travels along the drum towards the discharge end, the agglomerates are encapsulated in a heat skin envelope. The result that during the operation the capacity of the drum 13 kept as full as possible so that the agglomerates become encapsulated in a heat skin envelope as they travel down the drum enables the curing function to be effectively performed as shown in FIG. 2.

The drum 13 includes a mixing (an agglomeration) section and a curing (heated) section. The length of the agglomeration section is not heat jacketed. However, the curing section includes a heated jacket 16. As illustrated in FIG. 2, the drum is constantly rotated and the agglomerates collect near the internal bottom of the drum 13. As the material progresses down the drum 13 from the mixing section to the heated section, the heating jacket 16 starts the cure reaction. The curing reaction completes as the temperature reaches a temperature of approximately 150°–200° C. at the discharge end of the curing section. The major length of the heated section operates with the temperature of the agglomerated material in the drum being around 170° C. The temperature rise results from the exothermic heat reaction and the heat input from the jacket. At approximately 170° C. the alumina is converted to sulphate and then at approximately 200° C., any titanium oxide is converted to sulphate.

The length of the mixing section and advance of the mixed material is selected such that the mixing action occurs in the tumbling agglomerates for a period of approximately fifteen (15) minutes in the case of tailings from ore bodies orginating with Athabasca, Canada. In the ore bodies, the mixing varies depending on the mineralogical characteristics of the bodies, namely the wetting characteristics of the ore being processed. Generally, the residence time within the mixing section is approximately ten minutes. The rate of reaction of the specific mineral ores for conversion to sulphates determines the time required in the drum.

The cured agglomerates at the discharge end are released into an enclosed discharge hopper 17 where the hot fumes and products of reaction are sucked out by a fan and discharged via a heat exchanger 18 and a fume scrubber 19. The solids fall into a screw conveyor 20 which in turn discharges the solids into a leach liquor tank thickener 21 wherein the partially leached solids are thickened and sent into counter current washing systems via a pump 22. The concentrated leach liquor within thickener 21 is removed continuously at an outlet 23 and sent to a crystallizer 24 for metal salt removal before being recycled back to the thickener 21 either directly or indirectly by a counter current washer 25. The resultant metal salts may include aluminum and potassium sulphates. The excess heat from the thickener 21 is removed by a heat exchanger 26, e.g. steam boiler operating at low pressure.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A method of leaching mineral values from oil sand tailings comprising the steps of:

feeding a supply of dry oil sand fines containing metals into an elongated rotational mixer;

feeding a supply of concentrated sulphuric acid into said mixer;

continuously rotating said mixer to perform mixing of an agglomeration of said fines and acids to form a quantity of mixed agglomerates within said mixer and then heating said mixed agglomerates within an elongated portion of said mixer to elevate the temperature of said mixed agglomerates within said mixer to a temperature of approximately 170° C. or greater;

continuously advancing said mixed agglomerates longitudinally along said heated portion of said mixer; and discharging cured mixed agglomerates from said mixer into a water/leach liquor bath to thicken leached solids and form a slurry; and removing concentrated leach liquor and crystalizing said concentrated leach liquor for crystal metal salt removal.

2. The method of claim 1 further including, thickening partially leached solids to form thickened partially leached solids for further leaching; and recirculating liquor from said partially thickened leached solids after further leaching to said water/leach liquor bath.

3. The method of claim 2 wherein, the volume of said agglomerates within said mixer exceeds approximately thirty percent (30%) of the volume capacity of said mixer.

4. The method of claim 3 wherein, said concentrated sulphuric acid is greater than ninety-three percent (93%) by weight.

5. The method of claim 4 wherein, said fines fed into said mixer have a particle size less than −325 mesh.

6. The method of claim 5 wherein, said fines fed into said mixer have a water content of less than twelve percent (12%) by weight.

7. The method of claim 6 further including a step of, continuously advancing said agglomeration along said mixer and increasing the temperature of said agglomeration as said agglomeration is advanced within said mixer.

8. The method of claim 7 wherein, the maximum temperature of said agglomerates within said mixer is 200° C.

9. The method of claim 1 wherein, the volume of said agglomerates within said mixer exceeds approximately thirty percent (30%) of the volume capacity of said mixer.

10. The method of claim 9 wherein, the agglomeration is retained within said mixer for at least fifteen (15) minutes.

11. The method of claim 9 wherein, said cured agglomerates are discharged into a discharge hopper and hot fumes are removed prior to said cured agglomerates being discharged into said water/leach liquor bath.

* * * * *